No. 630,569. Patented Aug. 8, 1899.
O. J. SCOTT & W. W. HOLMES.
FILTER.
(Application filed Jan. 23, 1899.)
(No Model.)
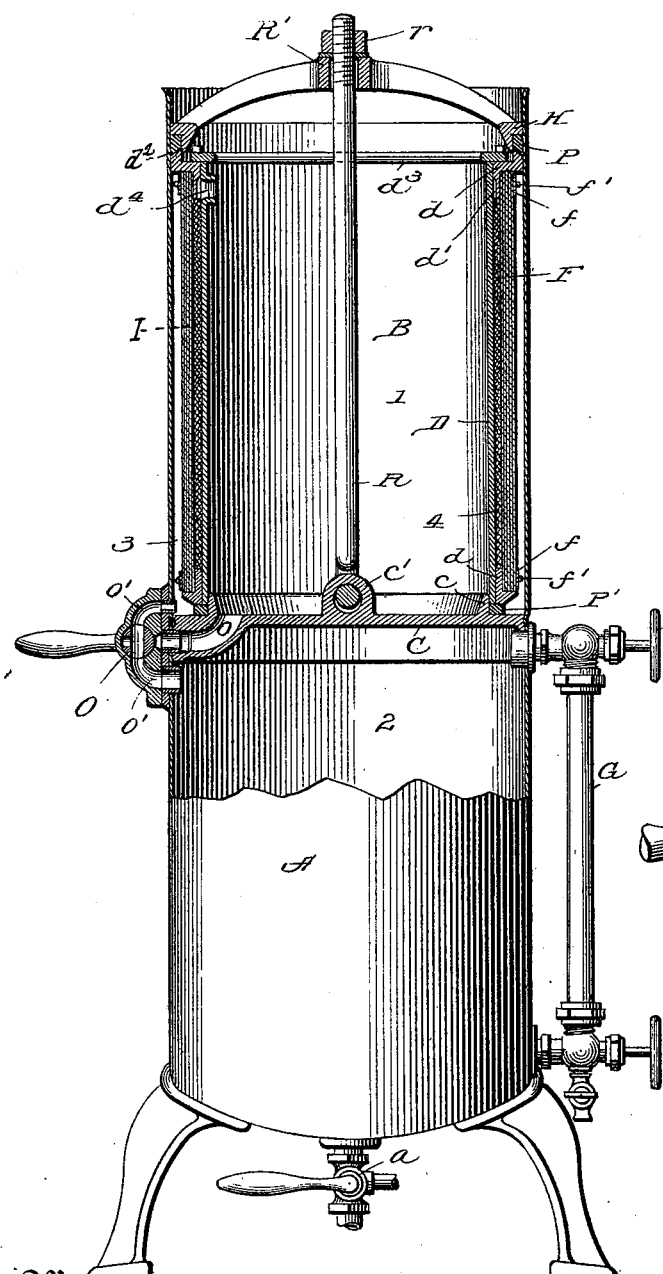
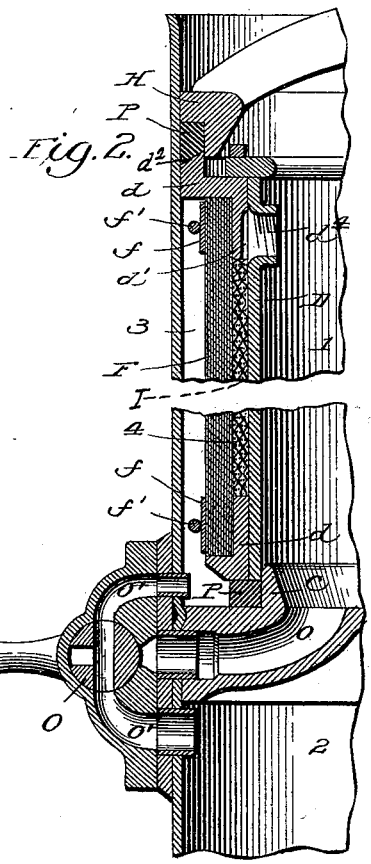
Witnesses
Harry S. Rohrer
M. Darley
Inventors
Orla J. Scott
William W. Holmes
by F. W. Ritter Jr.
Attorney

UNITED STATES PATENT OFFICE.

ORLA J. SCOTT AND WILLIAM W. HOLMES, OF CHICAGO HEIGHTS, ILLINOIS, ASSIGNORS TO THE Q & C COMPANY, OF CHICAGO, ILLINOIS.

FILTER.

SPECIFICATION forming part of Letters Patent No. 630,569, dated August 8, 1899.

Application filed January 23, 1899. Serial No. 703,168. (No model.)

*To all whom it may concern:*

Be it known that we, ORLA J. SCOTT and WILLIAM W. HOLMES, citizens of the United States, and residents of Chicago Heights, county of Cook, State of Illinois, have invented certain new and useful Improvements in Filters; and we hereby declare the following to be a full, clear, and exact description of the same, reference being had to the accompanying drawings, in which—

Figure 1 is a view, partly in elevation and partly in central section, of a filter embodying our invention. Fig. 2 is an enlarged vertical section of a detached portion of the filter and filter-chamber.

Like symbols refer to like parts wherever they occur.

Our invention has been especially devised for the filtration of oil and like fluids under pressure, but is to be taken—wherever the features of construction shall be found applicable—as pertaining to and embracing filters and filtration in general.

Broadly stated, the main feature of the invention embraces the combination, with a closed reservoir for the reception of the liquid to be filtered, of a filter-chamber communicating therewith and preferably superposed thereon and a detachable filter-cylinder or shell which supports the filtering medium and forms an annular filter of extended surface readily removable for cleansing or repairing.

A minor feature of our invention embraces the combination, in a filter, of a filter-cylinder or shell, a filtering medium, and an interposed reticulated support for the filtering medium, (preferably wire-cloth,) whereby a chamber for the reception of the filtered liquid is formed between the said shell and filtering medium.

There are other features of invention relating to the particular constructions and combinations of individual features, all as will hereinafter more fully appear.

We will now proceed to describe our invention more fully, so that others skilled in the art to which it appertains may apply the same.

In the drawings the preferred form of the filter is shown—that is to say, a cylindrical vessel supported on suitable legs, said vessel divided into two compartments, the lower constituting the reservoir and pressure-chamber A, which is closed and separated from the upper or open chamber B, which constitutes the filter-chamber, by a diaphragm or transverse partition C.

The lower chamber or reservoir A is provided at or near its bottom with a three-way cock $a$, whereby the medium of pressure may be introduced into the lower chamber or reservoir and whereby said chamber may be drained and any fluid, sediment, or deposit withdrawn, and it is also provided with a suitable gage G, whereby the quantity and quality of the fluid in the reservoir may be ascertained.

The partition or diaphragm C, which separates the chambers A and B, is provided on its upper surface with an annular flange or ring $c$ for the reception and centering of the filter-cylinder or shell D and with an eye or perforated lug $c'$ for the reception of one end of a clamp-rod R, whereby the shell or filter-cylinder D is retained in position within the filter-chamber B and close joints secured.

The upper or filter chamber B is open above for the introduction of the filter-chamber or shell D and communicates below with the reservoir or lower chamber by two passages $o$ and $o'$, guarded by a three-way cock O.

D indicates a shell or filter-cylinder for the support of the filtering medium, which shell also divides the upper chamber B into a central and a surrounding annular chamber. The internal diameter of said filtering-cylinder corresponds with the outer diameter of the annular flange or ring $c$ on the upper surface of partition C, which flange retains the filter-cylinder or shell D in position within the filter-chamber B.

The shell or filter-cylinder D may be a tube of steel or other suitable material and is provided at each end with a flanged ring $d$ to form seats for the opposite ends of the filtering medium that the same may be held detached or away from the shell or filter-cylinder D, and the upper ring $d$ is preferably provided on its inner face with a discharge or outlet groove $d'$ and is inclined upon its upper surface, as at $d^2$, to jam the packing-ring against the inner wall of chamber B when the clamping-ring H is in position. $d^3$ indicates a bail by means of which the shell or filter-cylinder D can be removed from chamber B.

Surrounding the shell or filter-cylinder D and interposed between the same and the filtering medium F is a reticulated medium I, (preferably wire-cloth,) adapted to support the filtering medium F and at the same time form a chamber between the shell or filter-cylinder D and the filtering medium for the reception of the filtered liquid and to conduct the same to the discharge-groove $d'$ and outlet $d^4$, (see Fig. 1,) whence the filtered liquid may be conducted by a suitable pipe to the clean-oil tank.

F indicates the filtering medium, which may be of any suitable character, but is preferably of paper wrapped upon the filter-cylinder (or reticulated medium) in one continuous length, its upper and lower edges resting in the seats of the rings $d$ $d$ and confined thereto by steel or equivalent clamp-bands $f$, which may be secured by wire bands $f'$ or in other suitable manner. In case paper is the filtering medium employed the surface of the filter may be readily cleaned of foreign matter by the removal of the outer layer from time to time.

H indicates a clamping-ring provided on its periphery with a suitable seat for the reception of a packing-ring P, interposed between said clamping-ring and the ring at the upper end of filter-cylinder D. A like packing-ring P' surrounds the annular flange $c$ on the upper surface of partition or diaphragm C and is interposed between the lower end of the shell or filter-cylinder D and said partition. The packing-rings P and P' may be of any suitable material, preferably spongy leather, as it is less liable to be affected by the liquid to be filtered.

The clamp-ring H is provided with a spider or series of radial arms united at the center by a hub R', through which passes the clamp-rod R, whose lower end is connected with the upper surface of partition or diaphragm C, as before pointed out. A nut $r$ upon the free end of the clamp-rod R is the preferred means of forcing the clamp-ring down upon packing-ring P and the shell or filter-cylinder down upon the packing-ring P' to secure tight joints.

In setting up the filter the shell or filter-cylinder D, which has been removed from filter-chamber B, is first wrapped with the wire-cloth or equivalent reticulated medium I, after which a sufficient number of layers of the filtering-paper or equivalent filtering medium F (dependent on the liquid to be filtered) is wrapped around the filter-cylinder over the reticulated medium and its ends or edges, which rest on the rings $d$ $d$, are clamped thereto by the clamp-band $f$ and wire $f'$ or other suitable means, after which the shell or filter-cylinder D is introduced into filter-chamber B, with its lower end inclosing the annular flange $c$ and resting on the packing-ring P'. The upper packing-ring P is then inserted, and finally the clamp-ring H, the upper end of the clamp-rod R being passed through the hub R' and the nut $r$ screwed home to force down the clamp-ring H and the shell or filter-cylinder D until tight joints are secured. This being accomplished, the filter as a whole will consist of four separate chambers, which may be indicated as follows: the central receiving-chamber 1, (B,) the reservoir 2, (A,) the outer annular filter-chamber 3, and the inner annular filter-chamber (or filtered-liquid chamber) 4. The first of said chambers, or central receiving-chamber, communicates with the reservoir or pressure-chamber A by means of the passage $o$, and the reservoir or pressure-chamber A communicates with the outer annular filter-chamber (for unfiltered liquid) by the passage $o'$, said passages controlled by the three-way cock O. The outer annular chamber 3 communicates with inner annular filter-chamber 4 (for filtered liquid) only through the filtering medium, and from the latter chamber 4 the filtered oil passes by passage $d'$ and a suitable outlet-pipe at $d^4$ to the filtered-oil tank, as hereinbefore noted.

In operation any suitable pressure—steam, air, hydraulic, or mechanical—may be employed in the reservoir-chamber A to force the liquid to be filtered through the apparatus; but where practicable, and especially in the filtration of oil, water-pressure is preferred and is employed as follows: The liquid to be filtered—as, for instance, oil—is introduced into the receiving-chamber 1 (center of B) and passes by oil-port $o$ to reservoir or pressure-chamber A, (2,) the three-way cock O being properly positioned to permit the same, after which the three-way cock O is turned (see Fig. 1) to open communication between reservoir A and unfiltered-oil chamber 3 by way of oil-passage $o'$. The three-way cock $a$ is then positioned to admit the pressure to chamber A—in case of oil-filtration the pressure is preferably obtained by means of boiler-water—and the pressure thus admitted to chamber A will force the liquid to be filtered through passage $o'$ into chamber 3, thence through filtering medium I into reticulated chamber 4, in which it will rise, and, collecting in groove $d'$ of the upper ring $d$, will pass thence into a suitable pipe which leads to the clean-oil tank. The gage G will indicate when all the oil or other liquid to be filtered has passed from the reservoir A, whereupon the three-way cock may be turned to close passage $o'$, which leads from the reservoir to the filter-chamber, and three-way cock $a$ may be turned to cut off connection with the source of pressure and open the discharge-port of reservoir A to permit the escape of any contained water or sediment which may have deposited in the reservoir.

Having thus described our invention, what we claim, and desire to secure by Letters Patent, is—

1. In a filter, the combination, with a reservoir, of a receiver which communicates with the reservoir, and a filter-chamber which surrounds the receiver and which communicates with the reservoir, substantially as and for the purposes specified.

2. In a filter, the combination with a reservoir, of a superposed receiver which communicates with the reservoir, and a filter-chamber which surrounds the receiver and communicates with the reservoir, substantially as and for the purposes specified.

3. In a filter, the combination with a vessel having a partition which divides it into a closed chamber or reservoir and an open or filter-containing chamber, of a detachable shell or filter-cylinder, a reticulated medium surrounding said shell, filtering medium which surrounds said reticulated medium, and means for securing said shell and its coverings within the open or filter chamber, substantially as and for the purposes specified.

4. In a filter, the combination with a filter-containing chamber, of a shell or filter-cylinder provided with rings for receiving the ends of the filtering material, a suitable filtering material secured at its ends to the rings of the shell or filter-cylinder, and a reticulated medium interposed between the shell or filter-cylinder and the filtering medium, substantially as and for the purposes specified.

5. In a filter, the combination with a shell or filter-cylinder provided at its ends with collars or rings, of a wrapping of wire-cloth extending between said rings or collars, and a filtering medium which incloses the wire-cloth and is secured to the collars or rings of the filter-cylinder; substantially as and for the purposes specified.

6. In a filter, the combination with a filter-containing chamber, of a shell or filter-cylinder having a detached filtering medium supported from said shell and forming an annular chamber between said shell and filtering medium, suitable packings for said shell or filter-cylinder, and a clamp for confining the filter-cylinder or shell within said filter-containing chamber, substantially as and for the purposes specified.

7. In a filter, the combination with a filter-containing chamber having on its interior an annular flange, of a shell or filter-cylinder, a clamp-ring, packings interposed between the shell or filter-cylinder and the clamp-ring and filter-chamber, and means for detachably securing said parts, substantially as and for the purposes specified.

8. In a filter, the combination with a vessel having a diaphragm which divides it into a closed and an open chamber said chambers connected by valved passages, of a shell or filter-cylinder provided with rings, a filtering medium secured at its ends to the rings of the shell, and means for confining the shell or filter-cylinder within the open or filter-containing chamber whereby a central receiving and surrounding filtering chamber are obtained, said chambers having independent communication with the closed chamber or pressure-reservoir, substantially as and for the purposes specified.

In testimony whereof we affix our signatures, in presence of two witnesses, this 16th day of January, 1899.

ORLA J. SCOTT.
WILLIAM W. HOLMES.

Witnesses:
B. C. WIEDERHOLD,
D. CONNOLLY.